A. A. REED.
SPRING WHEEL.
APPLICATION FILED SEPT. 18, 1917.
1,277,753.
Patented Sept. 3, 1918.
2 SHEETS—SHEET 2.
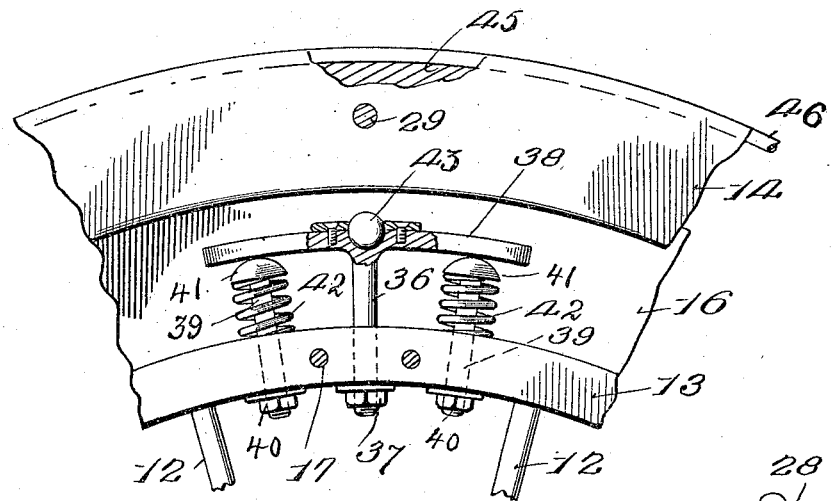
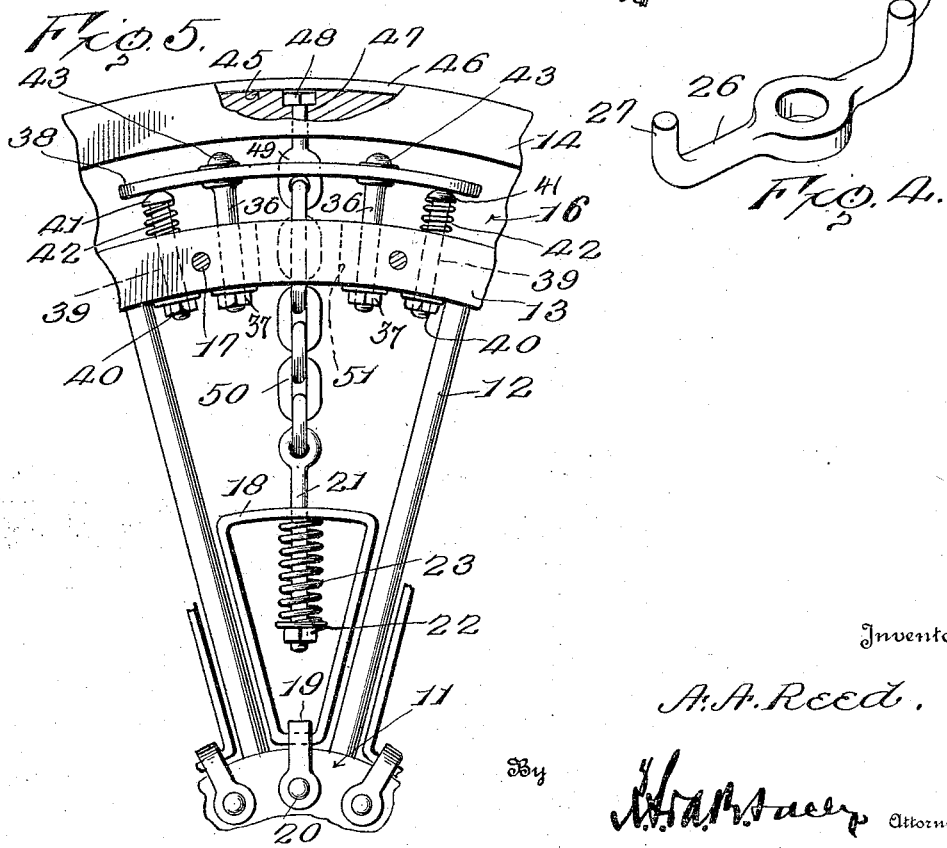
Inventor
A. A. Reed.
By
Attorneys

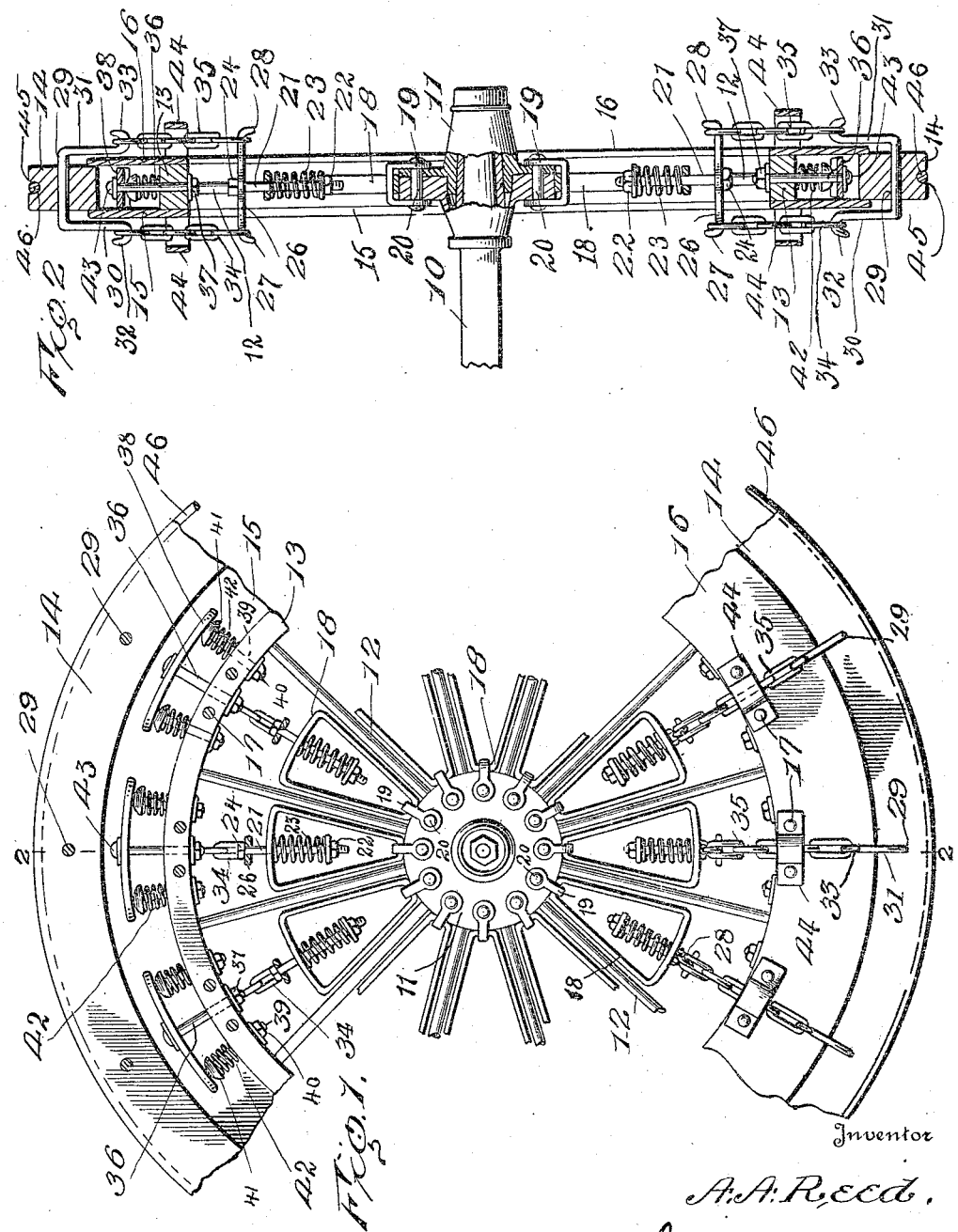

UNITED STATES PATENT OFFICE.

ALMON A. REED, OF ALCESTER, SOUTH DAKOTA.

SPRING-WHEEL.

1,277,753.

Specification of Letters Patent.

Patented Sept. 3, 1918.

Application filed September 18, 1917. Serial No. 191,987.

*To all whom it may concern:*

Be it known that I, ALMON A. REED, a citizen of the United States, residing at Alcester, in the county of Union and State of South Dakota, have invented certain new and useful Improvements in Spring-Wheels, of which the following is a specification.

This invention relates to improvements in wheels of the class of spring wheels, and has for one of its objects to provide an attachment including an improved arrangement of a spring supported tire and a plurality of yieldable cushion devices which become operative when the load upon the axle is increased beyond the normal.

With these and other objects in view, the invention consists in certain novel features of construction, as hereinafter shown and described and then specifically pointed out in the claims; and in the drawings illustrative of the preferred embodiment of the invention—

Figure 1 is a side elevation partly in section of a portion of a wheel with the improvements applied;

Fig. 2 is a section on the line 2—2 of Fig. 1;

Fig. 3 is an enlarged sectional detail illustrating the construction more fully;

Fig. 4 is a detached perspective view of one of the coupling members between the hub and the movable tire.

Fig. 5 is an enlarged detail view illustrating a modification in the construction.

The improved device may be applied to vehicle wheels of various sizes and width of felly and requires no material change in the wheel except to probably remove the ordinary tire of the wheel, but even this is not necessary.

For purposes of illustration the device is shown applied to a conventional wheel including an axle 10, hub 11, spokes 12 and felly 13.

Surrounding the felly and spaced therefrom is a relatively thick tire member 14, the width of the tire corresponding to the felly 13, as shown in Fig. 2. Bearing upon the side faces of the felly 13 are annular supporting plates 15—16, the plates being rigidly coupled to the felly by clamp bolts 17. The plates 15 and 16 are thus free to move over the side faces of the tire 14.

Disposed between each pair of the spokes 12 is an endless yoke frame 18, with its sides converging toward the axle and in parallel relation to the spokes. Each yoke member is coupled to the hub by a clip 19 and bolt 20, the latter preferably being one of the usual clamp bolts whereby the flanges of the hub are united.

Slidably disposed through the wider end of each of the yoke members is a pull rod 21 having a bearing plate 22 held in place by a nut, and a spring 23 surrounding each rod between the head and the wider outer end of the yoke 18. At its outer end each of the rods 21 is provided with a head 24, and surrounding each rod beneath the head is a transverse yoke member 26 having inwardly directed terminals or hooks 27—28. Extending transversely through the tire 14 in radial alinement with each of the rods 21 is another rod 29 having inwardly directed portions 30—31 terminating in hooks 32—33. Flexible members, preferably sections of chain 34—35, are coupled by their terminal links respectively with the hooks 27—28 and 32—33. By this means it will be obvious that the tire 14 is yieldably supported relatively to the body of the wheel, and any downward pressure upon the axle 10 will be borne by the yieldable members by which the tire is supported.

The springs 23 will be of sufficient strength to maintain the tire normally in concentric relation to the felly 13, but in the event of abnormal pressure being applied to the axle by an increase in the load the yokes 18, which for the time being are above the central line of the hub, will be moved downwardly against the resistance of the springs 23, and prevent jars or concussions being communicated to the body of the vehicle. By this means an effectual and efficient spring wheel is produced which will practically absorb the concussions and jars incident to the obstructions the wheel may meet in moving over the road.

Slidably disposed through the felly 13 are standards 36, one of the standards being disposed in radial alinement with each of the yokes 18 and the rods 21, as shown in Fig. 1. At its inner end each of the standards 36 is provided with a stop head 37 bearing against the inner face of the felly and limiting the outward movement, and attached to or formed integral with each standard 36 at its outer end is a bearing member 38 preferably in segmental form. Slidably disposed in the felly 13 and spaced from each of the standards 36 are radial rods 39 having heads 40 at their inner ends bearing against the inner face of the felly and with rounded heads 41 at their outer ends bearing against the inner face of the segmental members 38. A spring 42 surrounds each of the rods 39 between the heads 41 and the felly 13 and thus operates to yieldably support the plates 38 in their outward position with the heads 37 of the standards 36 maintained against the inner face of the felly. An anti-friction ball 43 is supported upon the outer face of each of the members 38 and adapted to be engaged by the inner face of the movable tire 14 when the relative positions of the members 13—14 are changed under the stress of the load. The standards 36 together with the segmental members 38 coact with the spring absorbing elements 42 which become effective when an abnormal load is applied to the axle, and thus relieve the springs 23 and yokes 18 from undue strain. The cushioning devices and the spring supported yokes thus coact to increase the efficiency and utility of the wheel and correspondingly increase its shock resisting properties and relieve the body of the vehicle from concussions and jarring movements.

Keepers 44 are attached to the plates 15—16, preferably by the same bolts 17 by which the plates are secured to the felly, and extend over the flexible members 34—35, to prevent undue lateral movement thereof.

The tire 14 is provided with an outwardly opening annular channel indicated at 45, and lying in this channel is an encircling tie rod 46, which materially strengthens and supports the tire.

In Fig. 5 a modification in the construction is shown consisting in substituting for the transverse yoke 26 and its hooked terminals 27—28 a radially disposed bolt 47 passing through the tire 14 and having a head 48 at the outer end embedded therein and with an eye 49 at the inner end. A single chain or other flexible member 50 connects the eye 49 with bolt 21 and passes through an aperture indicated at 51, through the felly 13.

In the modified structure, two of the standards 36 and their anti-friction balls 43 will be required, one on each side of the chain 50, as shown in Fig. 5. The apertures for the standards 36 will be necessarily enlarged to a sufficient extent to permit the requisite lateral play to the bolts when the plate 38 is forced inwardly.

The structure disclosed in Fig. 5 does not constitute a departure from the principle of the invention or sacrifice any of its advantages.

Having thus described the invention, what is claimed as new is:

1. The combination with a wheel including a hub, and felly, of a tire of greater diameter than the felly and spaced therefrom, a plurality of yoke devices connected to the hub, a yieldable member connected to each yoke device, a flexible connecting means between each yieldable member and the tire, a plurality of bearing members disposed between the felly and tire, means for limiting the outward movement of the bearing members, and spring controlled stop bolts carried by the felly and engaging the bearing members and yieldably holding them from inward movement.

2. The combination with a wheel including a hub and felly, of a tire of greater diameter than the felly and spaced therefrom, means for yieldably coupling said tire to the body of the wheel, a plurality of rods movable through the felly and each having a laterally directed member spaced normally from the tire, and springs between said laterally directed member and felly and adapted to resist abnormal eccentric movement of the tire.

3. The combination with a wheel including a hub and felly, of a tire of greater diameter than the felly and spaced therefrom, means for yieldably coupling said tire to the body of the wheel, a plurality of rods movable through the felly and each having a laterally directed member spaced normally from the tire, other rods movable through said felly, and springs operating to maintain said last mentioned rods in yieldable engagement with the laterally directed members and adapted to resist abnormal eccentric movement of the tire.

In testimony whereof I affix my signature.

ALMON A. REED. [L. S.]

Copies of this patent may be obtained for five cents each, by addressing the "Commissioner of Patents, Washington, D. C."